(12) United States Patent
Opalinski et al.

(10) Patent No.: US 8,972,375 B2
(45) Date of Patent: Mar. 3, 2015

(54) ADAPTING CONTENT REPOSITORIES FOR CRAWLING AND SERVING

(71) Applicant: Google Inc., Mountain View, CA (US)

(72) Inventors: Pawel Opalinski, Mountain View, CA (US); Brandon Player Iles, Mountain View, CA (US); Eric Jon Anderson, Sunnyvale, CA (US); John Felton, Pleasanton, CA (US)

(73) Assignee: Google Inc., Mountain View, CA (US)

( * ) Notice: Subject to any disclaimer, the term of this patent is extended or adjusted under 35 U.S.C. 154(b) by 53 days.

(21) Appl. No.: 13/721,863

(22) Filed: Dec. 20, 2012

(65) Prior Publication Data

US 2013/0332443 A1    Dec. 12, 2013

Related U.S. Application Data

(60) Provisional application No. 61/656,755, filed on Jun. 7, 2012.

(51) Int. Cl.
*G06F 17/30* (2006.01)
(52) U.S. Cl.
CPC .... *G06F 17/30864* (2013.01); *G06F 17/30893* (2013.01); *G06F 17/301* (2013.01); *G06F 17/30887* (2013.01)
USPC .......................................................... 707/709
(58) Field of Classification Search
CPC ............................................... G06F 17/30893
USPC ........................................................ 707/709
See application file for complete search history.

(56) References Cited

U.S. PATENT DOCUMENTS

| | | | |
|---|---|---|---|
| 2005/0060168 A1* | 3/2005 | Murashige et al. | 705/1 |
| 2007/0050338 A1* | 3/2007 | Strohm et al. | 707/3 |
| 2008/0313247 A1* | 12/2008 | Galvin | 708/200 |
| 2009/0094382 A1* | 4/2009 | Tsimelzon et al. | 709/246 |
| 2013/0332445 A1 | 12/2013 | Opalinski et al. | |

OTHER PUBLICATIONS

Blachman et al., How Google Works—Google Guide, Feb. 2, 2007.*
Google, DBConnectorConfigurationDetails—google-enterprise-connector-database—Configuration Form Details for Google Enterprise Connector for Databases, Jul. 7, 2010.*
Google, Administering Crawl: Introduction—Google Search Appliance—Google Developers, Nov. 2011.*
Google, Configuring File System Connector, Apr. 29, 2011.*
"Google Search Appliance—Connector Developer's Guide: Introduction", Google Search Appliance Software Version 6.2, Dec. 2009, 14 pages.
"Connector Developer's Guide: About This Guide", Google Search Appliance Software Version 6.2, Connector Manager Version 2.4.0, Dec. 2009, 3 pages.

* cited by examiner

*Primary Examiner* — William Spieler
(74) *Attorney, Agent, or Firm* — Brake Hughes Bellermann LLP

(57) ABSTRACT

A system for searching files stored in a closed file source that is not accessible via a web crawler obtains file identifiers for files stored in the file source and creates a unique URL for each of the identifiers. Each URL may be based on a file identifier and a domain portion of a URL associated with the system. The system may provide the unique URLs to a search engine. The system may respond to a crawl request from the search engine for a particular URL by converting the URL back into a file identifier, obtaining the contents of the file, creating an HTTP response from the contents of the file, and returning the response to the search engine. The system may respond to a request for a seed URL with a plurality of URLs as links in a single HTTP response.

20 Claims, 6 Drawing Sheets

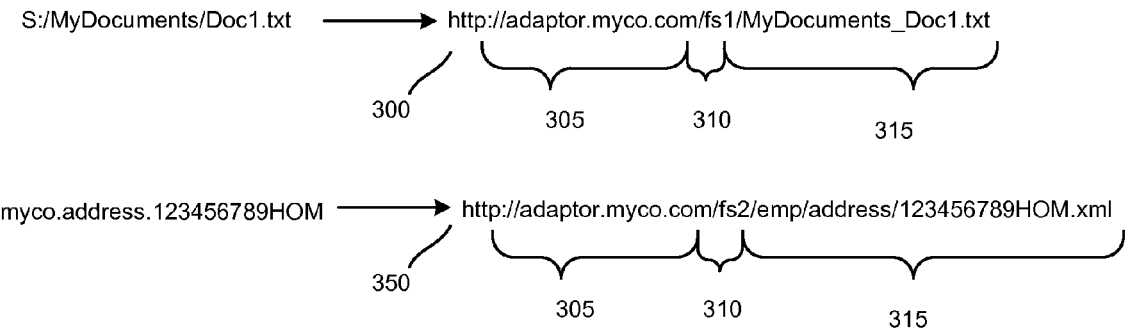
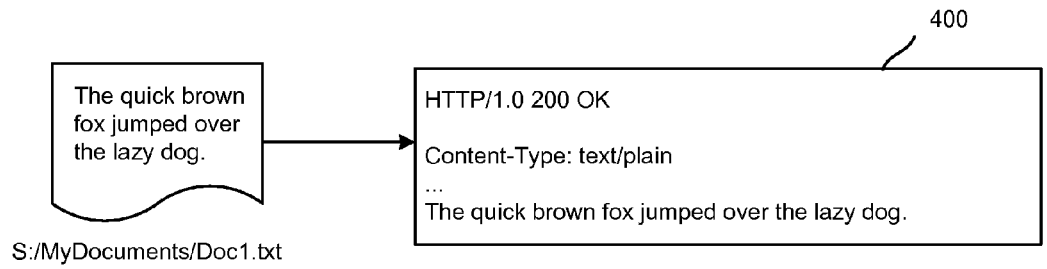
FIG. 3
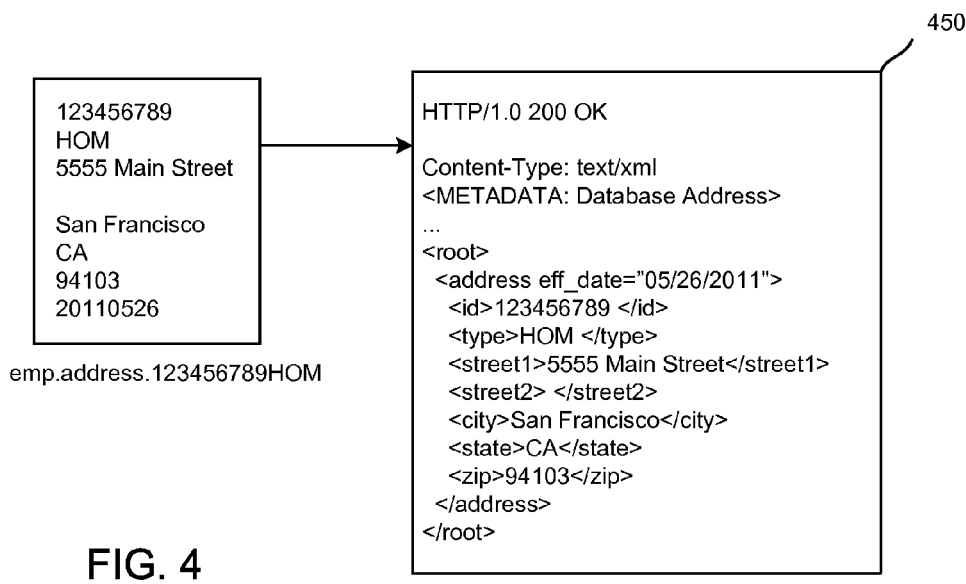
FIG. 4

600

```
HTTP/1.0 200 OK

Content-Type: text/html
...
<HTML>
<A HREF="http://adaptor.company.com/MyDocuments_doc1.html">Doc1</a>
<A HREF="http://adaptor.company.com/MyPics_doc2.html">Doc2</a>
...
[Other Content]
</HTML>
```

650

```
HTTP/1.0 200 OK

Content-Type: text/html
<HEAD>
    <link href="http://adaptor.company.com/fs2/emp/address/123456789HOM.xml">
    <link href="http://adaptor.company.com/fs2/emp/address/678912345MAL.xmll">
...
</HEAD>

<HTML>
[Other Content]
...
</HTML>
```

FIG. 6

ADAPTING CONTENT REPOSITORIES FOR CRAWLING AND SERVING

RELATED APPLICATIONS

This application claims priority under 35 U.S.C. §119 to Provisional Patent Application Ser. No. 61/656,755, entitled "ADAPTING CONTENT REPOSITORIES FOR CRAWLING AND SERVING" and filed on Jun. 7, 2012. The subject matter of this earlier filed application is hereby incorporated by reference.

BACKGROUND

This disclosure relates generally to searching document repositories and, content that is not accessible via the World Wide Web.

With the advent of the Internet and the World Wide Web, search engines were created to assist users in locating information from the millions of web pages accessible using these technologies. The search engines have become very efficient at indexing documents and responding to queries and have become familiar to many people. But, much of the data, documents, and other files used by organizations are not available via the Internet or an intranet and cannot be accessed through a uniform resource locator (URL). A URL is an address for a particular web-page, document, or other file that enables web-servers, search engines, and browsers to access the content of the particular file. A URL usually includes a domain portion, such as "www.myco.com" or "www.acme.net," and a path portion for a file, such as "/myfile/index.htm."

Files not accessible to the Internet are typically not indexed by web-based search engines. A search engine, such as an intranet search appliance or an Internet search engine, can index the content of such inaccessible files by receiving the content from a push by a connecting module. For example, a connecting module may acquire the contents of such files and push the contents of the files to the search engine in a linear stream. The search engine may index the contents and store the contents in its cache. To make the contents accessible in response to a search query, the search engine provides a URL to the cached contents.

Such systems suffer from drawbacks including: processing time and staleness. To push the contents of a file system to the search engine may take considerable time, and during the push the contents of some files may be lost without notice. Furthermore, the search engine cannot control the load on the web server pushing the file contents. Thus the process of pushing documents may be time and processing intensive. Moreover, the contents of the document served from the cache may become out-of-date, and the search engine may have no method of updating the contents without receiving another push.

SUMMARY

According to one general aspect, a computer-implemented method includes obtaining, using an adaptor being executed by at least one processor, file identifiers for files available in a file source. The files in the file source may be unavailable to a web crawler of a search engine remote from the file source and the adaptor. In some implementations the file identifiers may be for files that are modified or updated. The method may further include creating an HTTP compatible URL for each of the file identifiers and providing the created URLs to the search engine. The method may also include receiving, by the adaptor, a request from the search engine for contents associated with a particular URL of the provided URLs, obtaining file content from the file source using a file identifier determined based on the particular URL, and providing an HTTP response to the search engine, the response comprising the content of the file identified by the file identifier corresponding to the particular URL. In some implementations, the adaptor may provide the URLs to the search engine using a feeder function of the search engine.

In further implementations, the method may include receiving a second request for contents of the particular URL, determining whether a user initiating the request is authorized to access the file identified by the file identifier, and providing an HTTP response indicating the user is not authorized when it is determined that the user is not authorized. Such implementations may obtain the file content when it is determined that the user is authorized. In some implementations, the method may also include providing a URL for a seed file to the search engine, receiving a request for content associated with the URL for the seed file, and obtaining the filed identifiers in response to receiving the request for content associated with the URL for the seed file. In such implementations each URL may be provided as a link in a response sent to the search engine and the method may include receiving a second request for content associated with the URL for the seed file. In response, the method may include obtaining second file identifiers, the second file identifiers differing from the file identifiers obtained in response to the previous request and providing a second HTTP response to the search engine comprising URLs created for the file identifiers as links in the second response.

These and other aspects can include one or more of the following features. For example, the timing and frequency of requests for content may be controlled by the search engine, the file content may only be provided to the search engine after a request is received, or the URLS may be pushed to the search engine without the corresponding content of the files. As another example, the file source may be a database and the files maybe table rows in the database. Furthermore, each URL may be created from a file identifier and from a domain portion of a URL for the adaptor. The path portion of the URL may also include an identifier for the file source. The adaptor may include a plurality of modules, each module corresponding to a different file source.

According to yet another general aspect, a tangible computer-readable storage device having recorded and embodied thereon instructions that, when executed by a processor of a computer system, cause the computer system to obtain file identifiers for files from a file source, the file source being unavailable to a web crawler of a search engine, and create a uniform resource locator (URL) for each of the file identifiers, each URL including a domain portion of a URL for the computer system. The instructions may further cause the computer system to provide each URL to the search engine, receive a crawl request from the search engine for a particular URL of the provided URLs, and obtain file content using a file identifier determined based on the particular URL from the file source. The instructions may also cause the computer system to provide an HTTP response to the search engine, the response including the file content. In some implementations the instructions may cause the computer system to create a link for each URL in a second HTTP response and provide the second HTTP response to the search engine as part of providing each URL to the search engine. In some implementations obtaining the file identifiers may include obtaining file identifiers for all files stored in the file source.

According to another general aspect, a system may include at least one processor and a memory configured to store modules. The modules may include a lister module configured to provide identifiers for files stored in a file source accessible by the system but unavailable to a web crawler of a search engine that is remote from the file source; a retriever module configured to provide content of the files stored in the file source using the identifiers; and an adaptor module. The adaptor module may be configured to invoke the lister for a particular file source; receive file identifiers for files in the file source; create a uniform resource locator (URL) for each of the file identifiers, each URL including a domain portion of a URL for the system; and provide each URL to the search engine.

In further implementations, the adaptor module may be configured to receive a request for content associated with a particular URL of the provided URLs, obtain file content associated with a file identifier associated with the URL from the file source, and provide a valid web response to the search engine. The provided response may comprise the file content. In such implementations the modules may further comprise a security module configured to determine whether a user is authorized to access the file associated with the file identifier associated with the particular URL.

These and other aspects can include one or more of the following features. For example, the adaptor may be configured to provide the URLs to the search engine without the corresponding content of the files. In another example, the file source may be a database and the files may be table roes from the database. In some implementations the file source may not be directly accessible by the search engine.

According to yet another general aspect, a system may include at least one processor and a memory configured to store modules. The modules may include a retriever module for a file source accessible by the system, the retriever module may be configured to provide a seed file that contains identifiers for files stored on the file source, the file source being unavailable to a web crawler of a search engine, and to provide content of one of the files stored in the file source based on a received file identifier. The modules may also include an adaptor module configured to receive a first request for contents associated with a seed URL for the file source, obtain the seed file from the retriever in response to the request and create a URL for each of the file identifiers in the seed file. Each URL may include a domain portion of a URL associated with the system. The adaptor module may further be configured to provide a valid web response to the search engine, the response including the created URLs.

In further implementations, the adaptor module may be configured to receive a second request for content associated with the seed URL and obtain a second seed file from the retriever. The second seed file may contain file identifiers that differ from the filed identifiers obtained in response to the first request for content. In some implementations, each created URL may also include a path portion based on the file identifier.

According to one general aspect, a computer-implemented method includes receiving, using a search engine being executed by at least one processor, uniform resource locators (URLs) from an adaptor associated with the file source, wherein the URLs are received without corresponding file contents and adding the URLs to a crawl list. The method may also include sending a request to the adaptor for the contents associated with a particular URL of the URLs. In such implementations the adaptor may identify a file based on the particular URL, and the web crawler of the search engine may not access the file without using the adaptor.

These and other aspects can include one or more of the following features. For example, the closed file source may be a database and the files may be table rows from the database. In another example, the closed file source may be a document management system.

The details of one or more implementations are set forth in the accompanying drawings and the description below. Other features will be apparent from the description and drawings, and from the claims.

BRIEF DESCRIPTION OF THE DRAWINGS

FIG. 3 illustrates examples of creating a URL from a file identifier, consistent with some implementations.

FIG. 4 illustrates examples of creating a valid web response for content obtained from a file lacking a URL, consistent with some implementations.

FIG. 6 illustrates examples of a web response with links to files on a file source not accessible via the World Wide Web, consistent with some implementations.

Like reference symbols in the various drawings indicate like elements.

DETAILED DESCRIPTION

Figure 1:
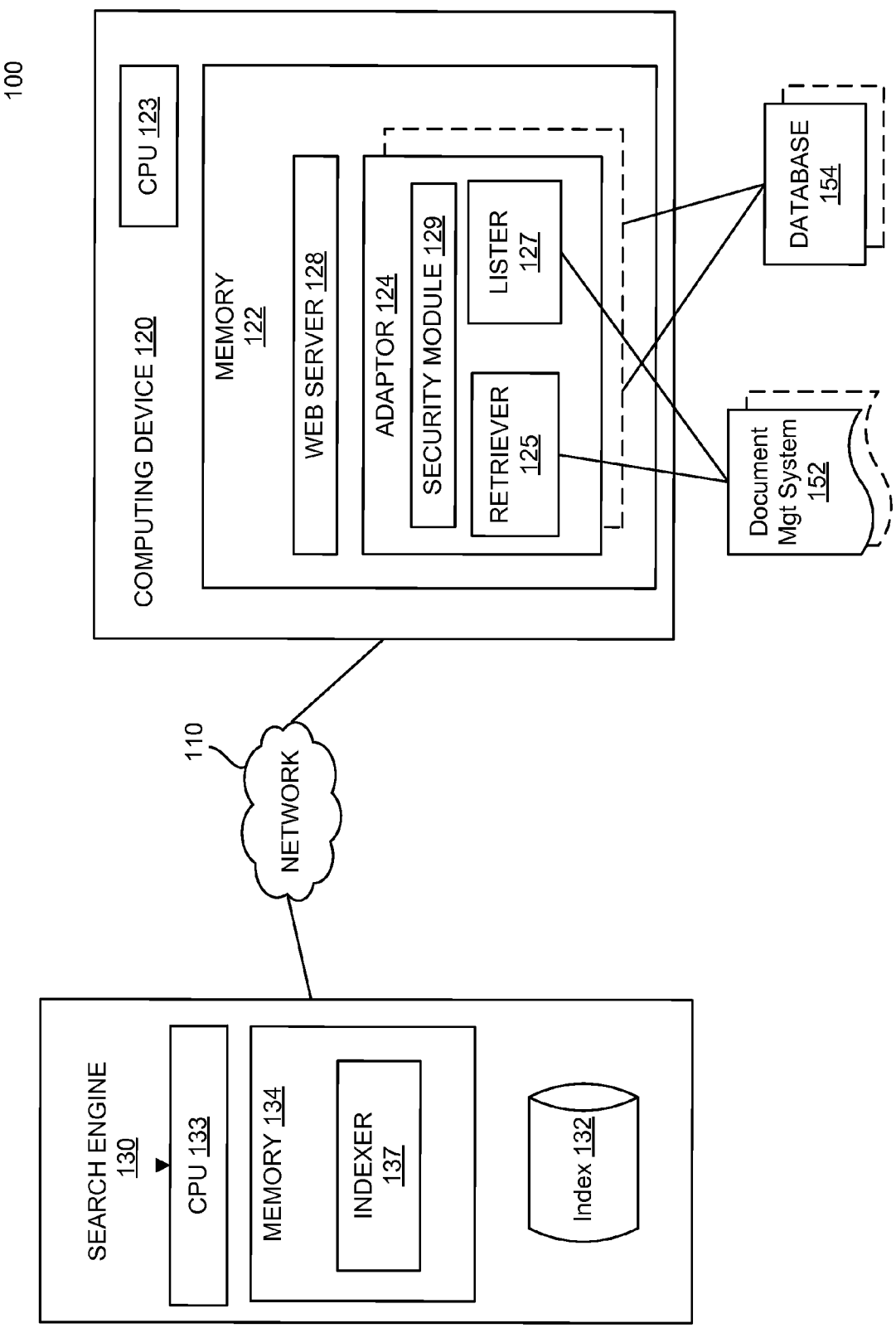
FIG. 1 illustrates an exemplary system in accordance with some implementations.

A system and method is disclosed for making documents, data, and other files accessible to a web crawler of a search engine. The content provided to the search engine can be materials stored in a content repository, particularly one that is local, secured, or internal to an organization. The system may include an adaptor in communication with a search engine. In some implementations, the adaptor includes a lister module that returns identifiers for documents or data from a non-web source, such as a file repository, document management system, or database. The adaptor may then convert the identifiers into unique URLs and return the URLs to the search engine, for example through a feeder process the search engine has to receive new URLs for its crawl list. The domain portion of the URL may point the search engine back to the web server associated with the adaptor. When the search engine is ready to crawl a particular URL, it sends a crawl request directed to the adaptor. Providing the search engine with a URL is fast and requires much less processing time that providing the contents to the search engine. Thus, the adaptor may provide greater than 100,000 URLs per second to the search engine, where providing the contents of the files may take days. Accordingly, the search engine may crawl the contents of the files subsequent to receiving a set of URLs pointing to the files. Furthermore, the search engine may use host-loading logic to crawl the URLs so that the crawling does not adversely affect the performance of the file sources.

When the search engine is ready to crawl a particular URL, the search engine may send a request to the adaptor to obtain the contents of the file identified by the URL. The web server may respond to the request with the contents, often in the format of an HTTP (Hyper Text Transfer Protocol) response. HTTP is a request-response protocol developed for communicating over networks, such as an intranet or the Internet. The protocol involves standards that ensure that the diverse computers communicating over the network use the same request-response format, and is the basis for communication using the World Wide Web. In some implementations, a standard HTTP protocol is used such as HTTP/1.1 (RFC2616) or any subsequently adopted standard communications protocol.

An HTTPS request/response is a secure, for example encrypted, version of an HTTP request/response. Disclosed implementations work with HTTPS responses as well as HTTP responses. Therefore, for the purposes of this document, reference to an HTTP protocol, request, response, or header also refers and applies to an HTTPS protocol, request, response, or header.

When the adaptor receives a request for the contents of a specific URL, the adaptor may translate the URL back into a document identifier. The adaptor may then invoke a retriever that may return the contents of the file associated with the identifier. The adaptor may then format the content into a valid web response and send the response to the search engine. Thus, the search engine is able to index and search documents, data, and information not directly available via the web. When a user performs a search on the index, the search results may include the URL of a particular file from the file source, as provided by the adaptor. If the user selects the URL, the search engine may send a request to the adaptor for the current contents of the file. In this manner the user has access to the most recent version of the file and not a cached, out-of-sync version.

In some implementations, the adaptor does not include the lister module. Instead, the search engine may be given a seed URL that points to the adaptor and a particular non-web-accessible file source. When the adaptor receives a request to crawl the seed URL, it may use the retriever to identify files from the non-web source, create URLs for the files, and incorporate the URLs into a valid web response as links. When the search engine encounters the links in the response to the request for the seed URL, the search engine may add the links to its crawl list. Thereafter, as discussed above, the search engine may send a crawl request for the URLs. As used herein, files may refer to documents, web pages, database records, spreadsheets, text files, audio files, pictures, or any other collection of information or data unit uniquely identifiable in a file source. Examples of files sources may include databases, document repositories, directories, file management systems, file servers, content management systems, enterprise resource planning and customer relationship management systems, business intelligence systems, etc.

FIG. 1 is a block diagram of a search system 100 in accordance with an example implementation. The system 100 may be used to implement a search of documents not accessible to a web server using the techniques described herein. The depiction of system 100 in FIG. 1 is shown by way of example. It will be appreciated that other configurations may be used for implementing such techniques.

Figure 7:
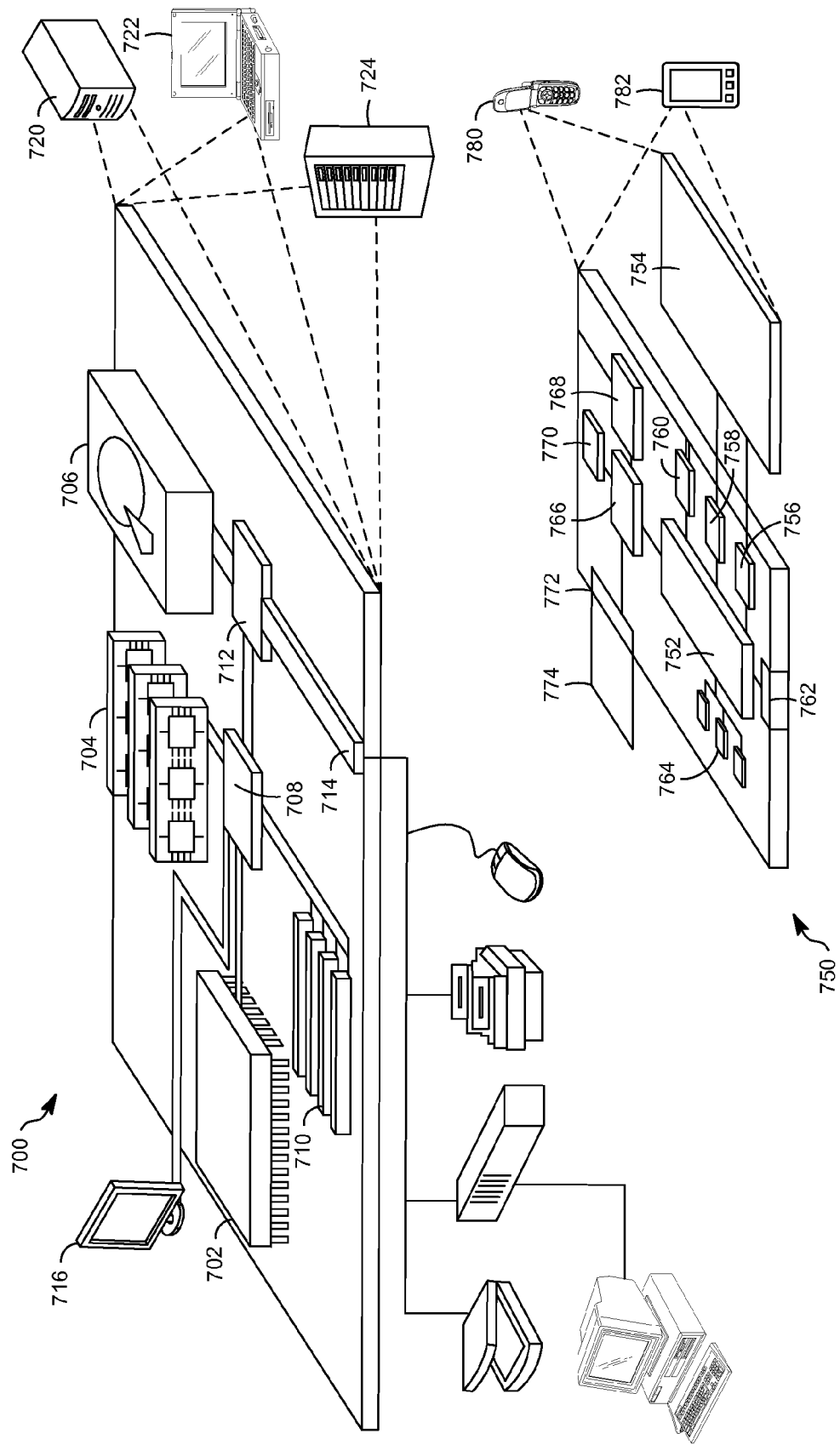
FIG. 7 shows an example of a computer device and a mobile computer device that can be used to implement the techniques described here.

The system 100 includes computing devices 120 and 130. The computing devices 120 and 130 may take the form of a number of different devices, such as a personal computer, laptop computer, tablet computer, netbook computer, or a web-enabled phone, as examples. The devices 120 and 130 may be examples of computer device 700 or mobile computer device 750, as depicted in FIG. 7.

As shown in FIG. 1, computing device 120 may include a CPU 123 and memory 122. Memory 122 may include any type of storage device that stores information in a format that can be read and/or executed by CPU 123. In some implementations memory 122 may include one or more software applications, such as web server 128 and one or more adaptor modules 124. In some implementations, adaptors 124 may be stored in an external storage device (not shown) and loaded into memory 122. Memory 122 may also include other software applications (not shown), such as an operating system and a user interface that allows a user to access and interact with the computing device 120.

In some implementations, adaptor 124 may include modules specific to particular file sources. For example, a database, such as database 154 may be in communication with one instance of an adaptor module and a document management system 152 may be in communication with a second instance of an adaptor module. In some implementations the adaptor 124 may include one module configured to handle multiple file sources.

Each module of adaptor 124 may include one or more of a lister 127 and a retriever 125. The lister 127 may contain instructions that cause CPU 123 to perform certain operations when invoked, including providing file identifiers, such as identifying names or numbers, for files stored in a file source. For example, a lister 127 for database 154 may provide a primary key for a row in the database 154 as a file identifier while a lister 127 for document management system 152 may provide a filename, optionally with a path, for a file stored in the document management system 152. When the adaptor 124 invokes its lister 127, the lister 127 may provide a file identifier for every file associated with the file source or, in some implementations, the lister 127 may provide a file identifier for files modified or added after a specified date and/or time. In some implementations the lister may track the last date and/or time that file identifiers are provided and use this value to determine which file identifiers to provide. In some implementations, the lister 127 may be configured to handle multiple file sources rather than servicing a single file source.

As mentioned above, a file source may include a document management system that controls access to documents, performs version control, and captures metadata about the documents it manages, or it may include a network file system, or it may include a database, etc. Unlike websites, the file sources, such as document management system 152 or database 154, may be unavailable to the web crawler of search engine 130. Being unavailable to the web crawler means that the files in the file sources are not visible to the web crawler and cannot be directly accessed via the web by search engines. Instead, search engines may only have access to the files associated with document management system 152 or database 154 through adaptor 124. However, to make access to the content available in the file source seamless, adaptor 124 may include instructions that cause CPU 123 to convert the file identifiers returned by the lister 127 into unique, valid, URLs, as will be discussed in more detail below with regard to FIG. 3. The adaptor 124 may then cause the CPU 123 provide the URLs to the search engine 130 in a manner that causes the search engine 130 to place the URL on its crawl list. For example, in some implementations, the search engine 130 may include a feeder function, such as a server push or a publish/subscribe function, that receives pushed URLs and places the URLs on the crawl list. Thus, the adaptor 124 provides a bridge between the search engine 130 and the various file sources, such as document management system 152 and database 154, making the files searchable using the search engine even though the files are not visible to or directly accessible by the search engine. Furthermore, the use of adaptor 124 frees the search engine from having to store a cached version of the file contents by separating the pushing of file identifiers, for example URLs, and file content.

Each module of adaptor 124 may also include one or more retrievers 125. In some implementations, the retriever 125 may contain instructions that cause CPU 123 to perform certain operations, including providing the content of a file when given a particular file identifier. For example, if provided a filename the retriever 125 may cause CPU 123 to provide the contents of the file, or if given a record number, row id, or primary key the retriever 125 may cause CPU 123 to provide the data from a row of a database corresponding to the record number. In some implementations, the retriever 125 may be configured to work with multiple file sources rather than servicing a single file source. After receiving the contents, adaptor 124 may convert the contents to a valid web response using the HTTP protocol. The response may be provided to the search engine 130 using web server 128. Thus, adaptor 124 may provide the contents of a file not accessible via the web to a search engine in a format that does not require any modifications to the search engine 130. The search engine 130 may crawl, index, and search the files as if they were accessible via the web.

In some implementations the adaptor 124 may not include the lister 127. In such implementations the retriever 125 may contain instructions that cause CPU 123 to provide a seed file that contains file identifiers for files stored in the file source. The retriever may provide the seed file instead of or in addition to the contents of a file identified by the seed URL. In such implementations, the seed file may contain identifiers for all of the files stored in the file source or the seed file may contain identifiers for a portion of the files stored in the file source. If a portion of the identifiers are returned in a particular seed file, a subsequent request for the seed file may result in a seed file with identifiers for a different portion of the files. For example, if the file source is a database, a first request for a seed file may result in a seed file having identifiers for the first 1000 records in the database, while a second request may result in a seed file having identifiers for the next 1000 records in the database.

Once adaptor 124 receives the file identifiers from the seed file, adaptor 124 may contain instructions that cause CPU 123 to convert the file identifiers to valid, unique URLs, as described above. The adaptor 124 may then convert the URLs to links in an HTTP response, for example by using an HTML anchor tag in the body of the response or a link tag in the header of the response.

In some implementations, the adaptor 124 may optionally include a security module 129. Security module 129 may contain instructions that cause CPU 123 to determine whether a particular user has rights to access a particular file. For example, the adaptor may invoke the security module when a user causes the search engine to request the content for a particular URL or when a user directly reaches the web server associated with the adaptor 124. The security module may determine whether the user requesting the particular file, corresponding to the particular URL, may access the file contents. If the security module determines that the user does not have access, the adaptor may return a valid web response that indicates that the user is not authorized. For example, the adaptor may return a response that contains an HTTP status code of 401 (unauthorized) or 403 (forbidden).

In the example of FIG. 1, search engine 130 includes CPU 133 and memory 134. Like memory 122, memory 134 may include any type of storage device that stores information in a format that can be read and/or executed by CPU 133. In some implementations memory 134 may include one or more software applications, such as indexer 137. In some implementations, software applications, such as indexer 137 may be stored in an external storage device (not shown) and loaded into memory 134. Indexer 137 may contain instructions that cause CPU 133 to perform certain operations, including maintaining a crawl list, making HTTP requests for URLs on the crawl list, parsing content returned in response to the request, and creating an index from the parsed content, parsing the contents and storing information about the primary contents and the metadata in a format that can be used to respond to search queries.

In the system 100, the computing device 120 and search engine 130 may be coupled via a network 110. Via the network 110, the computing device 120 and the search engine 130 may communicate with each other using, for example, HTTP protocols. Network 110 may be any computer network including an intranet or the Internet. While search system 100 illustrates only two file sources, i.e., 152 and 154, it will be appreciated that additional file sources may be included in system 100.

Although FIG. 1 nominally illustrates a single computing device executing the computing device 120 and search engine 130, it may be appreciated from FIG. 1 and from the above description that, in fact, a plurality of computing devices, e.g., a distributed computing system, may be utilized to implement the computing device 120 and/or the search engine 130. For example, adaptor 124 may include a module for document management system 152 executed in a first part of such a distributed computing system, and a second module for database 154 executed elsewhere within the distributed system.

More generally, it may be appreciated that any single illustrated component in FIG. 1 may be implemented using two or more subcomponents to provide the same or similar functionality. Conversely, any two or more components illustrated in FIG. 1 may be combined to provide a single component which provides the same or similar functionality. For example, the adaptor 124 may be a single module configured to handle multiple file sources and invoke multiple lister and/or retriever components, or the computing device 120 may include one module for each file source, and each module may invoke a lister and/or retriever configured to interact with a particular file source. Thus, FIG. 1 is illustrated and described with respect to example features and terminologies, which should be understood to be provided merely for the sake of example, and not as being at all limiting of various potential implementations of FIG. 1 which are not explicitly described herein.

Figure 2:
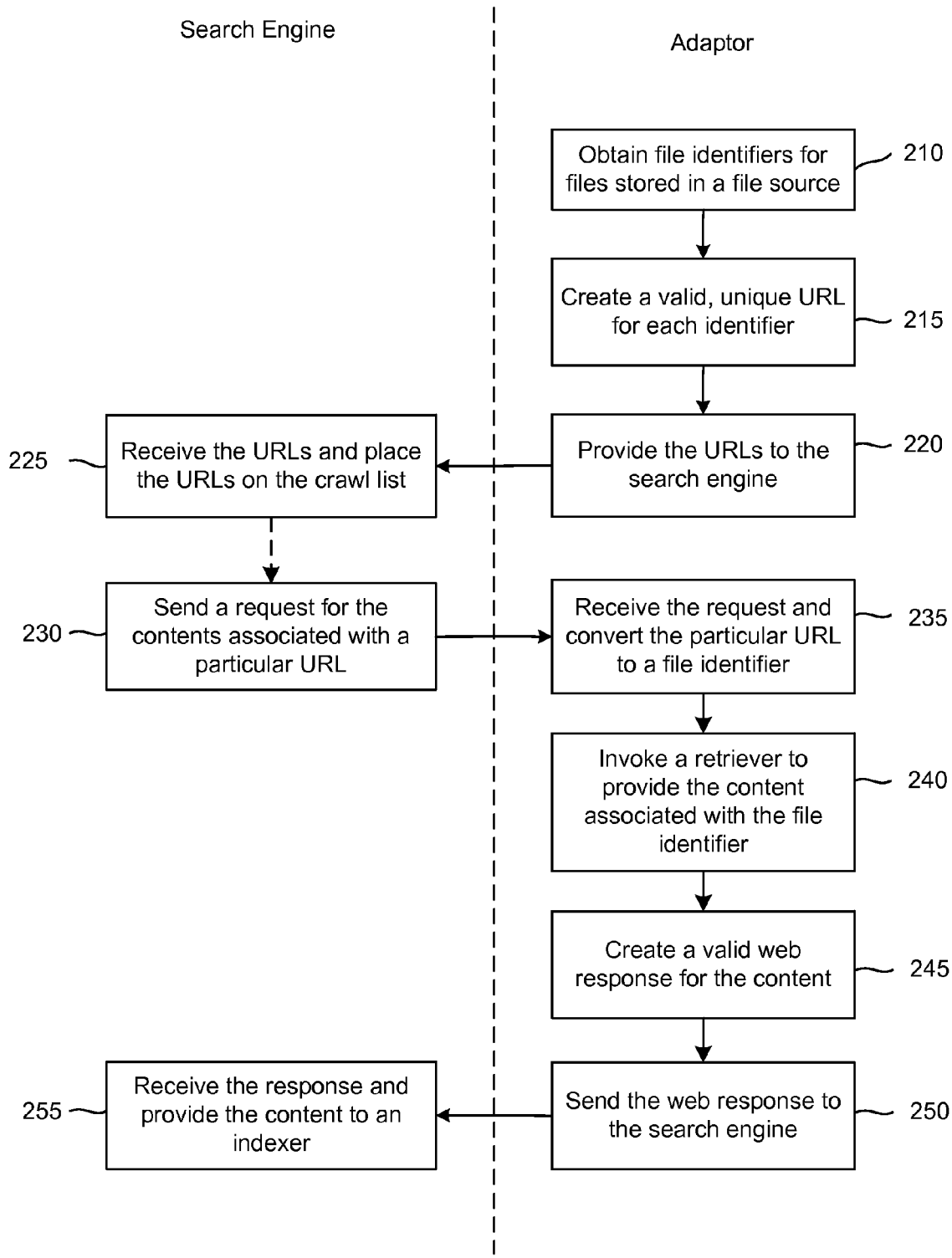
FIG. 2 is illustrates a flow diagram of an exemplary process for providing content of files not available to a web server to a search engine, consistent with some implementations.

FIG. 2 is a flow diagram of an exemplary process 200 for providing content of files not available to a web server to a search engine. The flowchart shown in FIG. 2 may be performed at least in part by a search engine (e.g., search engine 130 shown in FIG. 1) and a computing device associated with an adaptor (e.g., computing device 120 shown in FIG. 1). As shown in FIG. 2, an adaptor may obtain file identifiers from a file source (step 210). In some implementations, the adaptor or a lister component of the adaptor may be configured to make the request on a predetermined schedule, such as once a day, once a week, twice a week, etc.

In some implementations, the adaptor may obtain a file identifier for each file stored in the file source. In other implementations only file identifiers for files updated or added after a certain date and/or time may be obtained. In some implementations, a predetermined number, for example 1000, of identifiers for files stored in the file source may be obtained and at a later time another 1000 identifiers may be obtained. For example, when the file source is a network file system, the lister may request a list of documents stored in a particular directory and subdirectories of the network file system. In another example when the file source is a database, the lister may query the database for all records stored in a particular table. As discussed above, files may include records in a database, documents, such as PDF documents, word processing documents, spreadsheets, slide show presentations, CAD documents, audio files, picture files, text files, etc.

Once the adaptor obtains the file identifiers, the adaptor may create a valid, unique URL for each of the file identifiers. The URL for each identifier may be comprised of a domain portion and a path portion. The domain portion may resolve to the web server associated with the adaptor. For example, the adaptor may be associated with the URL "adaptor.myco.com." In some implementations, the domain portion may be an Internet protocol version 4 (IPv4) or version 6 (IPv6) address, such as 555.0.1.222 or 2001:0da6:83a3:0000:0000:3a1d:1072:832c. HTTP requests directed to this domain may be handled by the web server associated with the adaptor. When creating a URL for each of the identifiers, each created URL may begin with this domain portion. The path portion of the URL may be created by the adaptor based on the file identifier. For example, if the file identifier is numeric, the numeric characters may be used in the URL. If the file identifier is alphanumeric, the adaptor may percent encode the file identifier and use this value in the URL. Percent encoding is an HTTP protocol that designates certain characters as reserved and others as unreserved. Reserved characters have a specified meaning within the protocol and cannot be used without percent encoding. Unreserved characters do not need to be encoded. For example, the percent sign ("%") is a reserved character. It is used to mark the beginning of an encoded character. For this reason, if an actual percent sign is part of the file identifier, it must be encoded. Encoding generally takes the form of %<hexvalue> where <hexvalue> is the hexadecimal ASCII equivalent of the character being encoded. For example, the percent sign has a hexadecimal value of 25 and would be percent-encoded as "%25". Percent encoding is described in RFC3986, available at ietf.org.

In addition to the file identifier, additional information may be added to the URL to make the URL unique. For example, a directory where the file is stored may be added in front of the file identifier. If the file source is a database, the database name and table name may be added in front of the file identifier. In another example, the adaptor may maintain a table that maps the database and table name or directory to another identifier, such as an alphanumeric string. FIG. 3 illustrates examples of valid, unique URLs created from file identifiers. In the example of FIG. 3, the first file may be from a network file system. The file identifier may be the name of a text file stored in a particular network directory. In the example of FIG. 3, the filename is "Doc1.txt." Because there may be other files in the network of the same name, to make the URL unique, the adaptor may include the pathname as part of the URL. For example, URL 300 may include domain portion 305, taken from the domain associated with the adaptor, file source identifier 310, and the path portion 315. File source identifier 310 may be chosen by the adaptor to uniquely identify the S: drive on the network file system, so that every file stored on the S: drive has the file source identifier 310 of "fs1" as part of its URL. Path portion 315 may include the directory path where the Doc1.txt file is located, e.g., "/MyDocuments," and the file name, e.g., "Doc1.txt." As discussed above, the adaptor may percent encode the path portion 315 to ensure that the URL is valid.

In a second example illustrated in FIG. 3, the file identifier is a database.tablename.keyvalue for a database record. The URL 350 may include the domain portion 305, file source identifier 310, and path portion 315. In this example, the source identifier of "fs2" may correspond to the emp database. For example, the emp database may be an SQL database, an Oracle database, an IBM database, etc. The path portion 315 may include a tablespace name of "address" to identify the table that the row belongs to, and the primary key for the row, namely "123456789HOM." When converting the file identifier into a unique URL the adaptor may endeavor to preserve the human-readability characteristics of the file identifier.

Once a unique URL has been created for each of the obtained file identifiers, the adaptor may provide the URLs to a search engine (step 220). In some implementations, the adaptor may provide the URLs using a feed process used by the search engine to add new URLs to its crawl list. In some implementations, the adaptor may provide the URLs to a user who provides the URLs to the search engine. Any known method of providing URLs to a search engine may be used.

The search engine may receive the URLs and place the URLs on its crawl list (step 225). The search engine may use the crawl list to schedule a crawl of the URL. Each search engine may use its own logic for choosing what URLs to crawl from the crawl list. Accordingly, the search engine may choose to crawl a URL immediately while some search engines may wait. The search engine's decision on when to crawl a URL does not necessarily depend on the time and/or order that a URL is placed on the crawl list, which is denoted in FIG. 5 by a dashed line between steps 225 and 230. When the search engine is ready to crawl a particular URL, the search engine may request the contents associated with the URL, for example, by sending an HTTP request to the web server identified by the domain portion of the URL (step 230). The adaptor, through its associated web server, may receive the request and convert the particular URL back to a file identifier (step 235).

Once the adaptor has the file identifier, the adaptor may invoke a retriever module to provide the content associated with the file identifier (step 240). The retriever module may be specific to the file source and may be configured to cause the file source to return the file associated with the identifier. For example, in a network file system, the retriever may obtain the file handle of the file identified by the identifier. In another example, the retriever may request the contents of a database row with a primary key that matches the identifier. In some implementations the request may be initiated by a user interacting with the adaptor, for example through a request from a search results list or some other direct interaction with the web server associated with the adaptor. In such an implementation, the adaptor may determine whether the user has a right to access and read documents from the file source before invoking the retriever to obtain the file contents. If the user does not have access, the adaptor may not invoke the retriever and may produce an error message that indicates the user is not authorized to access the requested files.

Once the adaptor has access to the file contents, the adaptor may create a valid web response for the content (step 245). For example, the adaptor may create an HTTP response for a text document. FIG. 4 illustrates a partial example of such an HTTP response. HTTP response 400 illustrates an example of an HTTP response created from the file contents associated with the network file S:/MyDocuments/Doc1.txt. The content type of the HTTP response may be based on the file type. In some implementations, the adaptor may include a transformer that converts the document contents into another format. For example, the transformer may convert the text document to an HTML document. In such an example, the body of the HTML document may contain the contents of the file and HTML tags may be added based on the contents of the file, such as a title tag, metadata tags, etc. In some implementations, the adaptor may include an external data compiler that, for files not in a mark-up language, identifies metadata associated with the requested file, converts the metadata into name-value pairs and creates a specialized HTTP header in the HTTP response for the name-value pairs. Such an external data metadata extractor is described by U.S. Provisional Patent Application No. 61/656,830, filed Jun. 7, 2012, entitled "Methods and Systems for Providing Custom Crawl-Time Metadata," the contents of which are available in connection with U.S. Patent Publication No. 2013/0332445, the disclosure of which is incorporated herein by reference in its entirety.

HTTP response 450 illustrates another example of a valid web response. HTTP response 450 illustrates an example XML document created from a record in the Address table of the emp database. XML is an extended markup language that enables the exchange of data between computing systems. The adaptor may be configured to use the data dictionary of the emp database to create the XML tags for each column in the address table and insert the value stored in each column between the tags, as shown in HTTP response 450. The examples in FIG. 4 illustrate two possible examples of valid web responses, but the adaptor may generate other valid web responses not shown in FIG. 4.

In some implementations, if the file contents are not available, for example if the file has been deleted, the adaptor may create an HTTP response with a 404 status as the valid web response. A 404 status is a standard HTTP response that indicates that the server could not find what was requested. For example, 404 responses are returned when the server encounters a broken or dead link. Thus, if the retriever is unable to access the contents of the file, the adaptor may return the 404 response so the web server knows to delete or archive the broken URL from its index.

In some implementations the retriever may return file identifiers for files associated with the file in addition to the file contents. As one example, the retriever may use database relationships to return file identifiers for the contacts or friends of a person identified by the seed URL. In such implementations, the adaptor may create URLs for the file identifiers returned with the contents of the file and include the created URLs as links or metadata in the HTTP response that also contains the contents of the file.

Returning to FIG. 2, the adaptor may return the web response to the search engine (step 250). The search engine may receive the response and process the response as it would any other HTTP response from a website, including parsing and indexing the content (step 255). Thereafter, the search engine may treat the contents of the file as any other file available over the web. For example, the search engine may cache the HTTP response so that a sample page may be presented as part of search results. Accordingly, the adaptor may have inserted text or tags into the HTTP response that inform a user of the location of the document in the file source, so that the user knows where to find the original file.

Figure 5:
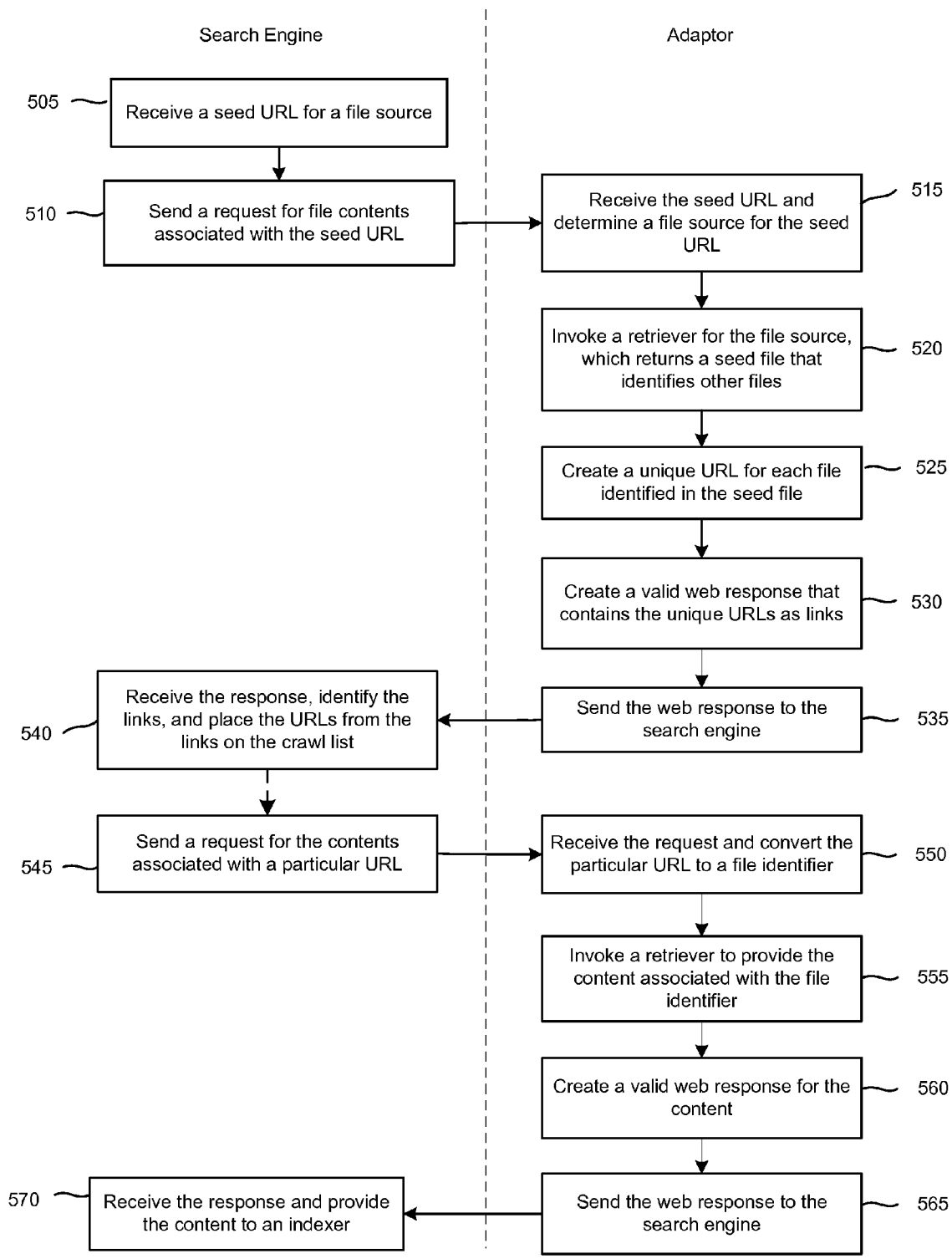
FIG. 5 is illustrates a flow diagram of another exemplary process for providing content of files not available to a web server to a search engine, consistent with some implementations.

FIG. 5 illustrates a flow diagram of another exemplary process 500 for providing content of files not available to a web server to a search engine. The flowchart shown in FIG. 5 may be performed at least in part by a search engine (e.g., search engine 130 shown in FIG. 1) and a computing device associated with an adaptor (e.g., computing device 120 shown in FIG. 1). For the example of FIG. 5 the adaptor may not include a lister component. Thus, in the example of FIG. 5, the search engine is provided with a seed URL (step 505), for example, by a user using an open port or by a link included in a web document. The search engine may then crawl, or send a request for the contents associated with, the seed URL (step 510). The seed URL may correspond to the web server associated with a particular adaptor, such as web server 128 of FIG. 1, but may not point to any particular file accessible to the adaptor. Instead, the adaptor may be configured to recognize the seed URL as a seed URL for a particular file source and to respond with a plurality of document identifiers for files stored in the file source. In some implementations the seed URL may be a URL that points to a location of the file source, such as a folder in a directory. The seed URL may also be a URL that points to an entity that is linked to other entities. For example, the seed URL may point to a record for a particular person in a database, and the particular person may be linked to other people through associations, such as friends, contacts, teammates, etc. Accordingly, the adaptor may receive the seed URL and determine a file source associated with the URL (step 515) and, optionally, a particular file associated with the URL. As discussed above, the adaptor may have access to a number of file sources and may include an adaptor module for each source or may have one or more adaptor modules configured to access more than one of the file source.

Once the adaptor has determined a file source, the adaptor may invoke a retriever for that source (step 520). In this example, the retriever is configured to return a list of file identifiers when responding to the seed URL and to return file contents when responding to a particular file identifier. At step 520 the retriever is responding to a seed URL and, thus, may respond with a plurality of file identifiers. In some implementations the retriever may return the contents of a particular file in addition to file identifiers for files associated with the particular file. For example, the retriever may return file identifiers for all files and folders stored in a folder identified by the seed URL. As another example, the retriever may use database relationships to return file identifiers for the contacts or friends of a person identified by the seed URL, in addition to information for the person identified by the seed URL. The retriever may respond with file identifiers for all associated files or with a subset of the identifiers.

If responding to the seed URL with a subset of file identifiers, the retriever or the adaptor may track the subsets already returned, so that each subsequent response to the same seed URL returns a subsequent subset. Once all file identifiers have been returned, the retriever may respond to the next request for the seed URL with the first subset. For example, the retriever may respond with the first 1000 records of a table in a database, and the next 1000 records on a subsequent response, the last 750 records on a third response, and the first 1000 records on the fourth response. The file identifiers obtained by the retriever in response to any particular request for a seed URL may be referred to as a seed file. Thus, the seed file contains file identifiers obtained in response to a request for the contents of the seed URL. Each file source serviced by the adaptor may have a different seed URL. As explained above, a seed URL may also point to a particular file in the file source that can be associated with other files.

In implementations with a security module, and in situations where a user initiated the request for the seed URL, the adaptor may invoke the security module before invoking the retriever to determine if the user requesting the content of the seed URL is authorized to access files associated with the file source. If the user is not authorized, the adaptor may not invoke the retriever and may create an HTTP response that indicates the user is not authorized to access the requested information.

The adaptor may then create a unique, valid URL for each of the file identifiers returned by the retriever (step 525), as discussed above with regard to step 215 of FIG. 2. The adaptor may then create a valid web response that contains the created unique URLs as links inside the response (step 530). For example, the adaptor may create a web response that includes each URL as the destination for an anchor tag in a created HTML document. In another example, the adaptor may include each URL in a link tag in the created HTML document. FIG. 6 illustrates examples of valid web responses that have a plurality of URLs as links. Web response 600 shows the URLs in anchor tags, while web response 650 shows the URLs in links tags. FIG. 6 illustrates two examples of how the URLs may be passed as links to the search engine, although other methods may be used.

The adaptor may then send the web response back to the search engine (step 535). The search engine may receive the response and identify the links in the response (step 540). Because the web response looks like other web-based files, the search engine may parse the content like other web-based files. When parsing received content, the search engine may add any encountered links in the page to its crawl list. Thus, as the search engine parses the content, it may encounter the links and add the URLs associated with the links to the crawl list. As discussed above, the search engine may use its own logic to determine when to crawl a URL once it is placed on the crawl list. The asynchronous nature of placing a URL on the crawl list and the decision to actually crawl the URL is represented by the dashed line between steps 540 and 545 of FIG. 5. The remaining steps 545 to 570 may be similar to steps 230 to 255 of FIG. 2, with the search engine requesting content for a URL, the adaptor converting the URL to a file identifier and invoking the retriever, retriever obtaining the content, the adaptor creating a valid web response using the content and sending the response back to the search engine, and the search engine indexing the received content.

In some implementations, the adaptor may also include a security module. The security module may be configured to determine whether a particular user has right to access and read particular files from the file source. For example, in some implementations a user may initiate the request the contents of a URL. In one example, a user may initiate the request after receiving search results that include the contents of one of the created URLs. If a user selects the search result that contains the contents, the search engine may send a request to the adaptor for the current contents associated with the URL or the search engine may send a request to the adaptor solely to determine whether the user is authorized to access the contents of the file. The adaptor may invoke the security module using an identifier for the user and the file identifier, and the security module may return a code indicating either that the user is authorized or is not authorized. In another example, a user may directly reach the web-server associated with the adaptor. In such an example, the adaptor may determine whether the user is authorized before invoking the retriever to deliver the contents of a particular file. Thus, the adaptor may protect the file sources from unauthorized access to the content of its files.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, a tablet computer, a television with at least one or more processors, or other similar devices.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
    obtaining, using an adaptor being executed by at least one processor, file identifiers for files available in a file source, the file source being inaccessible to a web-based search engine that is remote from the file source and the adaptor;
    generating a uniform resource locator (URL) from each of the file identifiers using the at least one processor, the file identifiers being HTTP incompatible and the URLs being HTTP compatible;
    providing each URL to the search engine without corresponding file content;
    receiving, by the adaptor, a request for file content associated with a particular URL of the provided URLs from the search engine;
    converting, by the adaptor, the particular URL into a file identifier, the file identifier uniquely identifying a file in the file source inaccessible to the search engine;
    obtaining the file content using the file identifier;
    converting the file content into an HTTP response; and
    providing, by the adaptor, the HTTP response to the search engine,
    wherein the adaptor makes the file source accessible to the search engine.

2. The method of claim 1, wherein the timing and frequency of requests for file contents are controlled by the search engine.

3. The method of claim 1, wherein file content is only provided to the search engine after a request is received.

4. The method of claim 1, wherein obtaining the file identifiers includes obtaining file identifiers for files that are modified/updated to the search engine.

5. The method of claim 1, wherein the search engine schedules a crawl of the URLs and receiving the request is triggered by the crawl.

6. The method of claim 1, further comprising:
    receiving, by the adaptor, a second request for file content of the particular URL;
    determining whether a user initiating the request is authorized to access the file identified by the file identifier corresponding to the particular URL;
    providing an HTTP response indicating the user is not authorized when it is determined that the user is not authorized; and
    obtaining the file content when it is determined that the user is authorized.

7. The method of claim 1, further comprising:
    providing a URL for a seed file to the search engine;
    receiving, by the adaptor, a request for content associated with the URL for the seed file; and
    obtaining the file identifiers in response to receiving the request for content associated with the URL for the seed file,
    wherein providing each URL to the search engine includes providing each URL as a link in a response sent to the search engine.

8. The method of claim 7, further comprising:
    receiving a second request for content associated with the URL for the seed file;
    obtaining second file identifiers in response to receiving the second request, wherein the second file identifiers differ from the file identifiers obtained in response to the previous request; and
    providing a second HTTP response to the search engine, the second HTTP response including URLs generated for the file identifiers as links.

9. The method of claim 1, wherein the file source is a database.

10. The method of claim 9, wherein the file identifier includes a primary key of a row in a table of the database.

11. The method of claim 1, wherein each URL includes a path portion generated from the file identifier and a domain portion identifying a web server associated with the adaptor.

12. The method of claim 1, wherein the adaptor includes a plurality of modules, each module corresponding to a different file source.

13. A system comprising:
    at least one processor; and
    a memory storing modules including:
        a lister module configured to cause the at least one processor to provide identifiers for files stored in a file source accessible by the system but unavailable to a web-based search engine that is remote from the file source,
        a retriever module configured to cause the at least one processor to provide file contents for files stored in the file source using the identifiers, and
        an adaptor module configured to cause the at least one processor to perform the following operations:
            invoke the lister module for a particular file source,
            receive file identifiers for files in the file source,
            generate a uniform resource locator (URL) from each of the file identifiers, each URL including a domain portion identifying a web server associated with the adaptor module,
            provide each URL to the search engine without corresponding file content, receive a request for content associated with a particular URL of the provided URLs, convert the particular URL to a file identifier, the file identifier uniquely identifying a file otherwise unavailable to the search engine, invoke the retriever module to obtain file content for the file identified by the file identifier, convert the file content into a valid web response, and provide the valid web response to the search engine.

14. The system of claim 13, wherein the modules further include a security module configured to cause the at least one processor to determine whether a user is authorized to access the file associated with the file identifier associated with the particular URL.

15. The system of claim 13, wherein the search engine schedules a crawl and receiving the request is triggered by the crawl.

16. The system of claim 13, wherein the file source is a database and the file identifier includes a primary key of a row in a table of the database.

17. The system of claim 13, wherein the adaptor module is further configured to cause the at least one processor to perform the operations of:

receiving, from a client, a request for content associated with the particular URL, wherein the particular URL was provided to the client as a search result;

converting the particular URL to the file identifier;

obtaining, using the retriever, file content from the file source associated using the file identifier;

converting the file content into a valid web response; and providing the valid web response to the client.

18. A computer-implemented method of crawling, indexing, and searching a closed file source comprising:

receiving, using a search engine being executed by at least one processor, uniform resource locators (URLs) from an adaptor associated with the closed file source, wherein the URLs include a domain portion that identifies a web server associated with the adaptor and respective remaining portions generated from respective file identifiers, each file identifier uniquely identifying a respective file in the closed file source, and wherein the URLs are received without corresponding file contents;

adding the URLs to a crawl list;

sending a request to the adaptor for the content associated with a particular URL of the URLs, wherein the adaptor converts the particular URL into a corresponding file identifier that identifies the file in the closed file source;

receiving file content for the corresponding file identifier for indexing, the file content having been converted by the adaptor into a valid web response; and indexing the valid web response, wherein the search engine cannot access the file content without using the adaptor to convert the particular URL into the file identifier and to retrieve and convert the file content.

19. The method of claim 18, wherein the closed file source is a database and the file identifier includes a primary key of a row in a table of the database.

20. The method of claim 18, wherein the closed file source is a document management system.

* * * * *